(12) United States Patent
Laine

(10) Patent No.: US 8,698,672 B2
(45) Date of Patent: Apr. 15, 2014

(54) SYSTEM FOR POSITIONING IN A LOCATION OPAQUE TO THE SIGNALS OF A SATELLITE NAVIGATION SYSTEM

(75) Inventor: Robert André Laine, Paris (FR)

(73) Assignee: Astrium SAS, Paris, FL (US)

( * ) Notice: Subject to any disclaimer, the term of this patent is extended or adjusted under 35 U.S.C. 154(b) by 132 days.

(21) Appl. No.: 12/867,076

(22) PCT Filed: Feb. 16, 2009

(86) PCT No.: PCT/FR2009/000169
§ 371 (c)(1),
(2), (4) Date: Aug. 11, 2010

(87) PCT Pub. No.: WO2009/115676
PCT Pub. Date: Sep. 24, 2009

(65) Prior Publication Data
US 2010/0309045 A1    Dec. 9, 2010

(30) Foreign Application Priority Data

Feb. 20, 2008   (FR) .................................. 08 00912

(51) Int. Cl.
*G01S 3/02*    (2006.01)
*G01S 1/08*    (2006.01)
*G01S 5/02*    (2010.01)

(52) U.S. Cl.
USPC ............ 342/464; 342/386; 342/445; 342/448

(58) Field of Classification Search
USPC .................. 342/464, 386, 445, 448, 451, 463
See application file for complete search history.

(56) References Cited

U.S. PATENT DOCUMENTS

| | | | |
|---|---|---|---|
| 6,374,134 B1 | 4/2002 | Bladen et al. | |
| 6,720,921 B2 * | 4/2004 | Ripingill et al. | ............. 342/464 |
| 6,762,721 B2 * | 7/2004 | Halsey et al. | ................. 342/442 |
| 7,061,429 B2 * | 6/2006 | Fager et al. | .................... 342/464 |
| 7,202,815 B2 * | 4/2007 | Swope et al. | ................. 342/427 |
| 2003/0156062 A1 | 8/2003 | Ripingill, Jr. et al. | |
| 2005/0215269 A1 | 9/2005 | Cheok et al. | |
| 2006/0132352 A1 | 6/2006 | Schantz et al. | |
| 2007/0257831 A1 | 11/2007 | Mathews et al. | |
| 2008/0122696 A1 * | 5/2008 | Huseth et al. | ................. 342/464 |

* cited by examiner

*Primary Examiner* — Cassie Galt
(74) *Attorney, Agent, or Firm* — Novak Druce Connolly Bove + Quigg LLP

(57) ABSTRACT

According to the invention, the system comprises: at least three position beacons (3) arranged about said location (2) and emitting in the long-wave range, and an apparatus associated with the user (1) and including means for receiving, processing and displaying the information transmitted by said beacons (3).

13 Claims, 4 Drawing Sheets

SYSTEM FOR POSITIONING IN A LOCATION OPAQUE TO THE SIGNALS OF A SATELLITE NAVIGATION SYSTEM

CROSS-REFERENCE TO RELATED APPLICATIONS

This application is a §371 national stage entry of International Application No. PCT/FR2009/000169, filed Feb. 16, 2009, which claims priority to French Patent Application 0800912, filed Feb. 20, 2008, the entire contents of which are incorporated herein by reference.

FIELD OF THE INVENTION

The present invention aims at a terrestrial positioning system allowing a user to know his/her position and his/her orientation in a location being opaque to signals emitted from known satellite navigation systems.

BACKGROUND OF THE INVENTION

It is known that satellite navigation systems generally allow a terrestrial user to determine his/her position and, optionally, his/her altitude.

However, when the user is located in some places, such as underground passages, buildings, thick forests, etc., it can occur that signals emitted by said satellite navigation systems cannot reach said user, who, as a result, cannot know either his/her position, or his/her orientation.

The aim of the present invention is to overcome such a drawback.

SUMMARY OF THE INVENTION

To this end, according to the invention, the system for terrestrial positioning of a user in a location wherein signals emitted from satellite navigation systems cannot be received, is remarkable in that it comprises:
- at least three beacons, arranged around said location, outside the latter and able to emit radio-electric signals comprising information on their respective terrestrial positions, the transmission wavelength for each beacon being at least decametric; and
- at least one equipment associated to said user and comprising at least:
  - reception means adapted to receive said radio-electric signals emitted by said beacons,
  - calculation means adapted to calculate, from said radio-electric signals emitted by said beacons, the terrestrial position and orientation of said equipment, and
  - indication means adapted to let know to said user the thus calculated terrestrial position and orientation of said equipment.

The present invention is based on the observation that said locations are opaque to signals emitted by satellite navigation systems as a result of the low wavelength (of about 20 cm) of said signals. On the contrary, according to the invention, large and at least decametric wavelengths are implemented, and, preferably, hectometric or even kilometric ones, adapted to transmit position information for beacons inside said locations opaque to microwaves of signals from satellite navigation systems.

From information received from said beacons, the calculation means are adapted, using known calculation methods, to determine the position and orientation of said equipment (that is, of said user) compared to said beacons and, accordingly, the terrestrial position and orientation of said equipment.

The emission wavelengths of said beacons could be different one from the other, each wavelength being specific to a beacon. In such a case, said reception means could identify each beacon by its own emission frequency and said beacons could emit simultaneously.

On the contrary, said emission wavelengths of said beacons could be identical, said radio-electric signals emitted by said beacons then comprising identification codes specific to each of them and adapted to be identified by said reception means. In such a case, said beacons could alternately emit.

Furthermore, said beacons could comprise input means, such as for example a keyboard, so that an operator is able to let them know said information on their positions. Such information could be recorded by said operator with the help of a geographical map or from indications given by a satellite navigation system.

Alternatively, in order to know their positioning and be able to deliver said radio-electric signals comprising position information, said beacons could comprise receiving and processing means for signals emitted by a satellite navigation system.

Preferably, each beacon comprises reception and processing means able to listen to electric signals emitted by other beacons. In this case, it is advantageous that operating the system according to this invention occurs from a master beacon, first implemented, triggering the other beacons occurring in cascade as they are being implemented. Thus, the user is able to know his/her position and orientation before all the beacons of the system are implemented.

Furthermore, said reception means of said equipment associated with the user comprise at least three antennas, of the loop type, with their planes being not coplanar. Preferably, such planes are two by two orthogonal.

The user of the system according to this invention can be of any nature, for example, it could be a robot or a human being. In this second case, advantageously, said antennas are arranged on a headset, adapted to be carried by said user's head.

Moreover, advantageously, the whole of said equipment is enclosed in a casing to be carried by said user. Such a casing could be tight in order to provide for the use in water or in the presence of an aggressive environment.

Advantageously, said indication means are adapted to represent the position and orientation of said user, whether human or not, on a map, a plan of said location or any other analogous geographical reference.

It should be noticed that the system according to this invention has the advantage of not requiring any equipment, other than that associated with the user, inside said location. Thus, implementing thereof could be particularly discrete.

BRIEF DESCRIPTION OF THE DRAWINGS

The figures of the appended drawing will make it clear how this invention could be implemented. In these figures like reference numerals relate to like components.

DETAILED DESCRIPTION

Figure 1:
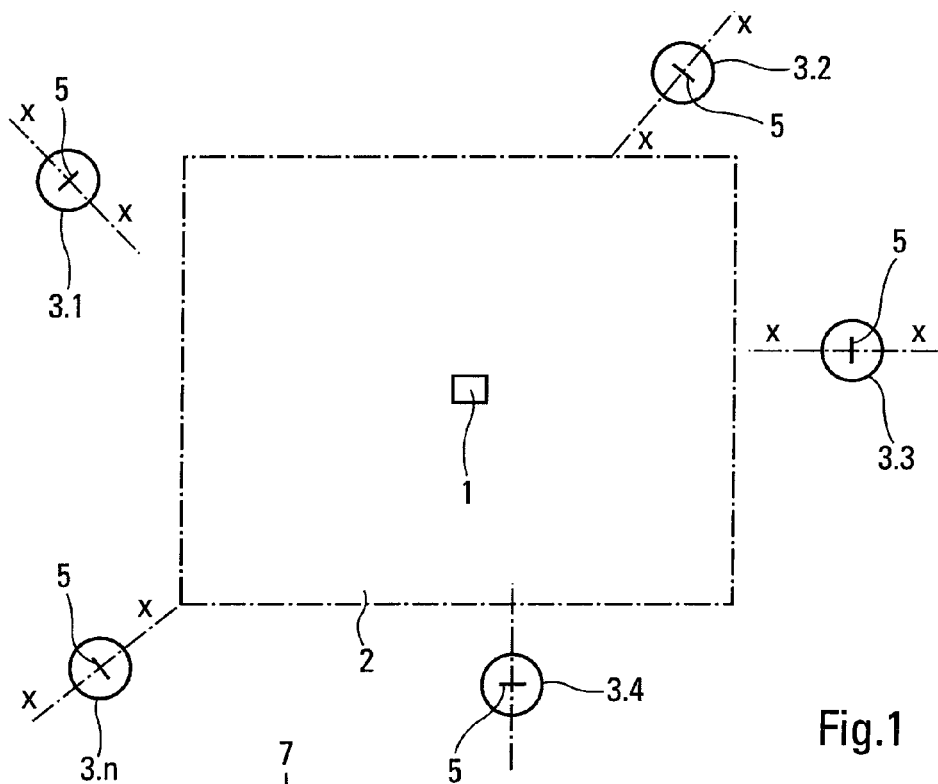
FIG. 1 is a schematic plane view showing a plurality of beacons arranged around a location being opaque to signals from satellite navigation systems.

On FIG. 1, there is shown a user 1 (for example, a human operator) located in a location 2 (for example, a building, a forest, an underground facility, etc.), inside which signals emitted from a satellite navigation system cannot be received. Around said location 2, outside the latter, there are arranged a plurality of beacons 3, respectively designated through references 3.1, 3.2, 3.3, . . . , 3.n (n being an integer at least equal to 3), able to emit on a wavelength carrier, being at least decametric, but preferably hectometric or kilometric.

Figure 2:
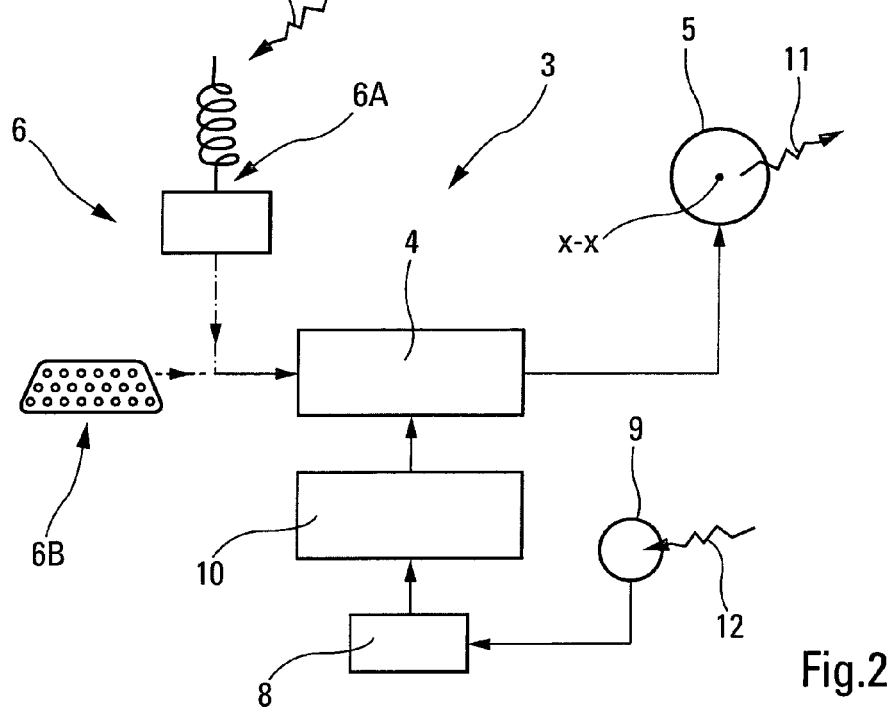
FIG. 2 shows the block diagram of an examplary beacon implemented according to this invention.

In the examplary embodiment 3 on FIG. 2, each beacon 3.1, 3.2, 3.n comprises:
- an emitter 4 able to emit on such a wavelength and provided with an emitting antenna 5 of the magnetic loop type, with an axis x-x;
- means 6 adapted to enter in said emitter 4 information relating to the terrestrial position of the corresponding beacon 3.1, 3.2, 3.n. Such means 6 could comprise an equipment GA receiving position signals 7 from a satellite navigation system and/or a keyboard 6B (or any other analogous means) able to manually enter position information, for example recorded on a map;
- a receiver 8 allowing each beacon 3.1, 3.2, . . . to listen to emissions from other beacons, by means of a receiving antenna 9, also of the magnetic loop type; and
- a processor 10 receiving the signals as received by the receptor 8 and steering the emitter 4.

Around the location 2, the external beacons 3.1, 3.2, 3.3, . . . are arranged so that the axis x-x of the antenna 2 of each of them be oriented towards said location 2. Thus, each beacon can, through the emitter 4 and the antenna 5 thereof, address to the user 1 being in said location 2, a radio-electric signal 11 comprising a decametric, hectometric or kilometric carrier modulated by information relating to its own position. Furthermore, through its antenna 9, each beacon 3.1, 3.2, . . . receives the radio-electric signal emitted by the other beacons: on FIG. 2, the thus received signal by a beacon is designated with the arrow 12.

The carriers of the different beacons 3.1, 3.2, 3.n could have different frequencies, allowing to identify them. However, for simplicity purposes, all the beacons preferably use the same carrier frequency. It is then required that the emitter 4 of each beacon incorporated into the radio-electric signal 11 emits a code for identifying the corresponding beacon.

Obviously, each emitter 4 could still incorporate other information into its radio-electric signal 11.

In the case where the beacons 3.1, 3.2, . . . all transmit at the same frequency, the processors 10 of each of them control the corresponding emitter 4 so that, at each time, one single among said beacons emits its radio-electric signal 11. For example, an advantageous sequencing mode adapted for a progressive spreading out of the n beacons 3.1, 3.2, 3.3 . . . around the area 2, while providing a service to the user 1 during such spreading out, is as follows (considering for example that n is equal to 7 and that a sequencing cycle is divided into n+1=8 phases):
- the first beacon 3.1, implemented around the area 2 acts as a master for initializing the sequence: it transmits its radio-electric signal 11 for a one eighth of time, repeats it so as to occupy the 7 eighths of the following time and listens during the last eighth of time;
- the second beacon 3.2 to be implemented listens to the first beacon 3.1 (radio-electric signal 12), infers therefrom that the code thereof is 2 and transmits the signal thereof 11 while said first beacon 3.1 is silent: the latter having heard the second beacon 3.2 delays its transmission resumption by 1 eighth of cycle and also reduces its transmission duration by 1 eighth of cycle;
- the third beacon 3.3 to be implemented listens to the first beacon 3.1, then the second beacon 3.2, and infers therefrom that the code thereof is 3; it emits the radio-electric signal 11 thereof, immediately after the signal 11 of the second beacon 3.2 has been emitted;
- the first beacon 3.1, having listened to the beacons 3.2 and 3.3 delays its transmission resumption by 1 eighth of cycle and, in addition, reduces the transmission duration thereof also by 1 eighth of cycle;
- etc., the initialisation sequence of each following beacon 3.4 to 3.n repeating until the last beacon 3.n is implemented.

Figure 3:
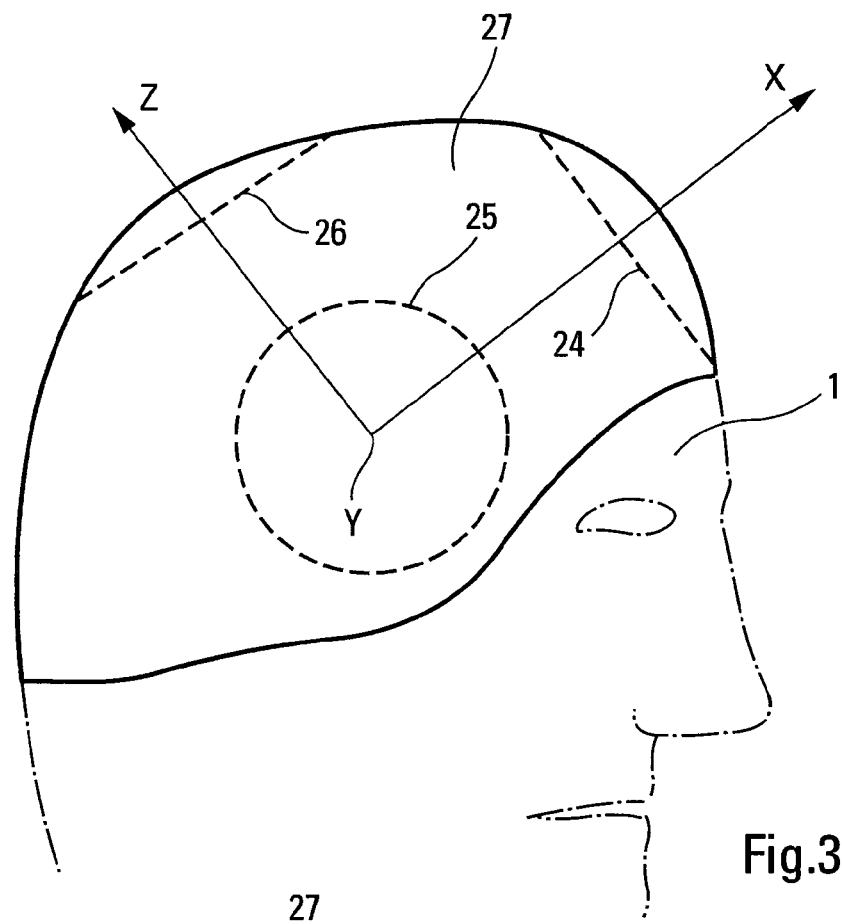
FIGS. 3 and 4 are respectively side and top views of a headset provided with loop type reception antennas.
Figure 4:
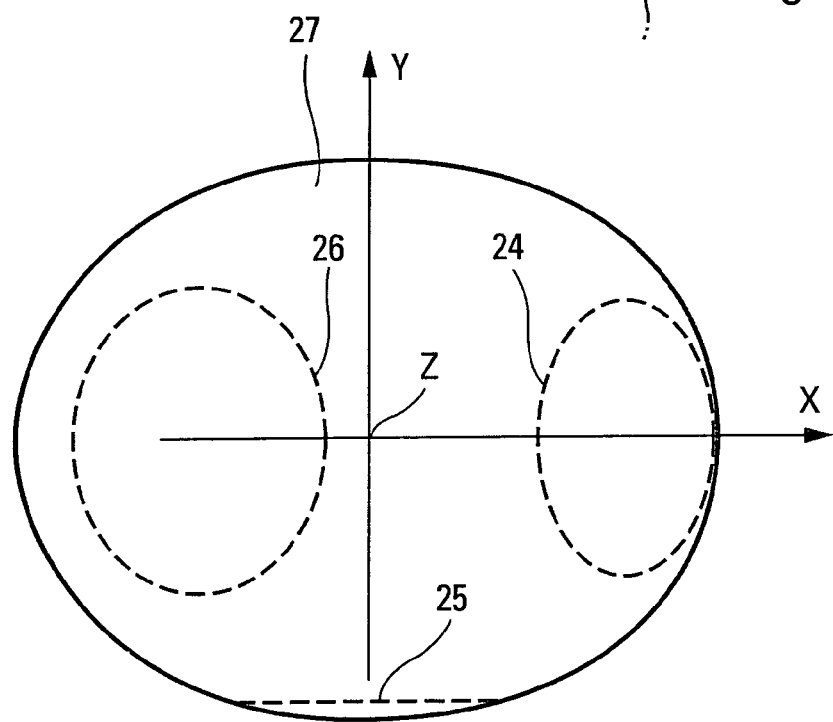
Figure 5:
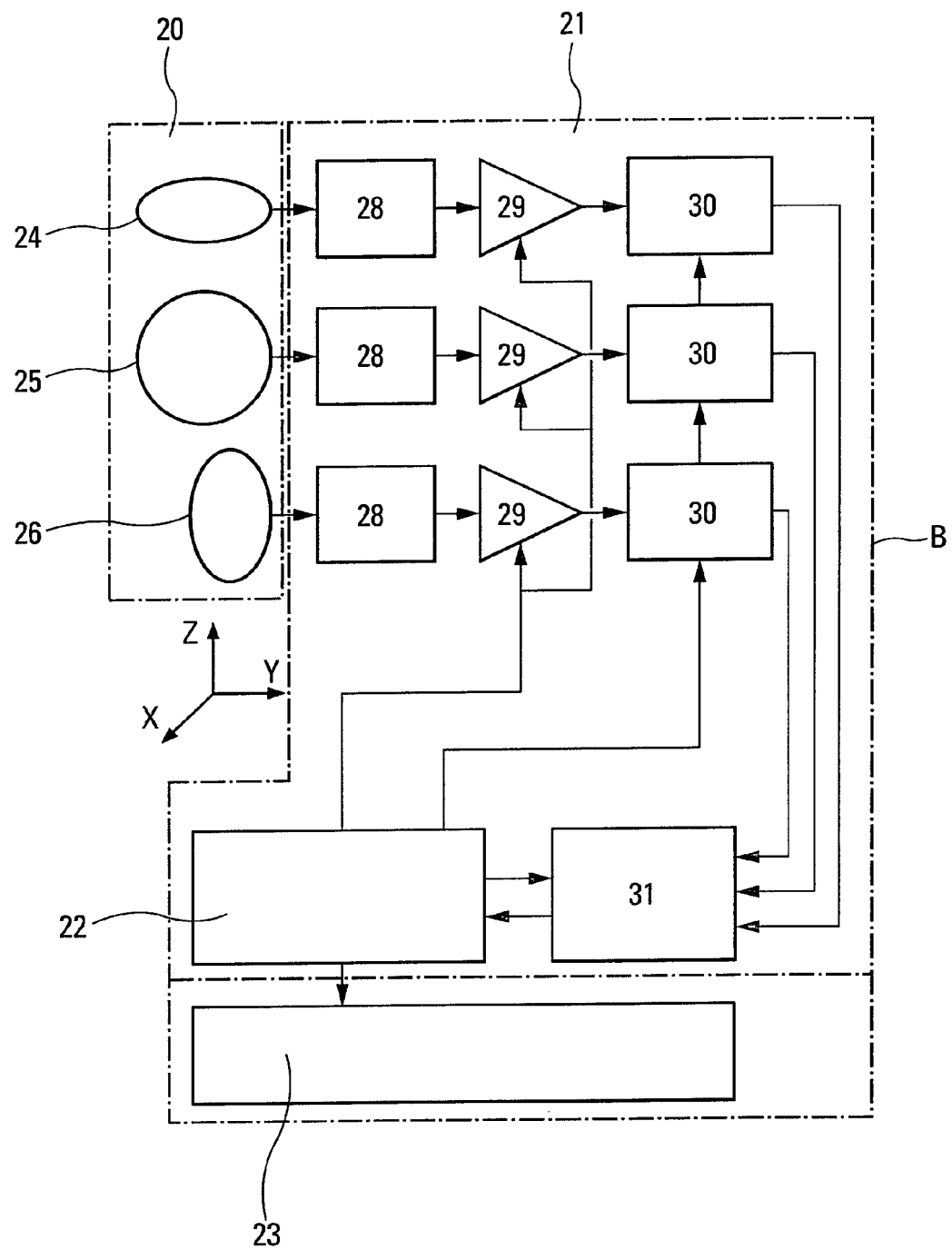
FIG. 5 shows the block diagram of an examplary equipment associated to said user and adapted to the headset on FIGS. 3 and 4.

Furthermore, as shown on FIGS. 3, 4 and 5, the user 1 is provided with reception means 20 adapted to receive the radio-electric signals 11 as emitted by the beacons 3.1 to 3.n, with means 21 for processing said received signals comprising calculation means 22 able to calculate, from said signals, the terrestrial position and orientation of said equipment, and with indication means 23 able to transmit to said user the terrestrial position and orientation of said equipment.

Preferably, means 20 to 23 are built so as to be easily carried by said user 1. For example, means 21, 22 and 23 are incorporated into a portable casing B, whereas, as shown on FIG. 3, reception means 20 providing for a direction reception of the radio-electric signals 11 as emitted by the beacons 3.1 to 3.n comprise three antennas 24, 25 and 26 incorporated into a headset 27 adapted to be carried by the user's head 1.

The antennas 24, 25 and 26 are of the loop type and they are arranged so that the respective axes thereof X, Y and Z form a three dimension system of orthogonal axes acting as a geometrical reference system for the user 1, that is, the planes of said antennas are two by two orthogonal.

The processing means 21 comprise, for each antenna 24, 25, 26 (see FIG. 4), a band-pass filter 28, an amplifier 29 and a sampler 30, simultaneously performing filtering, amplifying and sampling of the signals received from the three antennas 24, 25 and 26. The processing means 21 further comprise an analog-digital converter 31 receiving the signals coming from the three samplers 30 and delivering them to the calculation means 22. The latter steer the three samplers 30 and, the case being, adjust the gain of the three amplifiers 29.

From the signals received from the antennas 24, 25, 26, through the filters 28, the amplifiers 29, the samplers 30 and the converter 31, the calculation means 22 calculate, for each beacon 3.1 to 3.n (using known mathematical methods):
- the total amplitude of the signal received from said beacon by the three antennas; and
- the three guiding cosines of the signal received from said beacon.

Based on the results of such calculations, performed for each beacon, the calculation means 22 calculate the apparent angles between said beacons, then (through the known capable arc method) the position and the orientation of the user 1 with respect to the beacons 3.1 to 3.4. The terrestrial positions of the latter being known (through means 6), the calculation means 22 infer therefrom the terrestrial position and orientation of said user 1. The latter are transmitted to the indication means 23, able to understand a system for displaying such a position and such an orientation on a map or a plan of said location 2.

It is to be noticed that the previous calculations are based on the instantaneous value of the signals 11 and are thus independent from the sampling time thereof. Such a property has the advantage to be able to sum digital signals from all the paths, this sum could then be used for measuring the total signal being received and used for the gain automatic command, so that the analog-digital converter 31 works in its linear area. The same sum signal is also processed for extracting therefrom the message carried by the modulation of each beacon, such a message comprising the position of the beacon, the identification code thereof and, optionally, auxiliary data for users.

Figure 6:
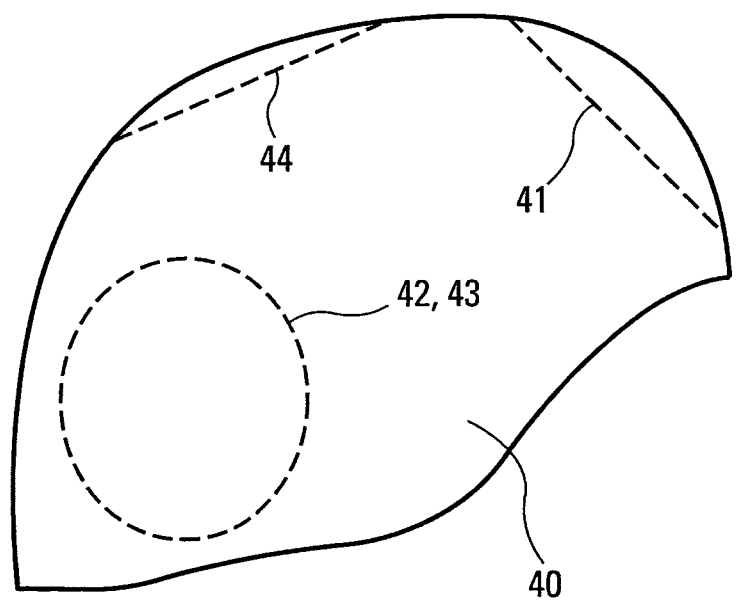
FIGS. 6 and 7 are views respectively identical to FIGS. 3 and 4 of an alternative headset to be used according to the present invention.
Figure 7:
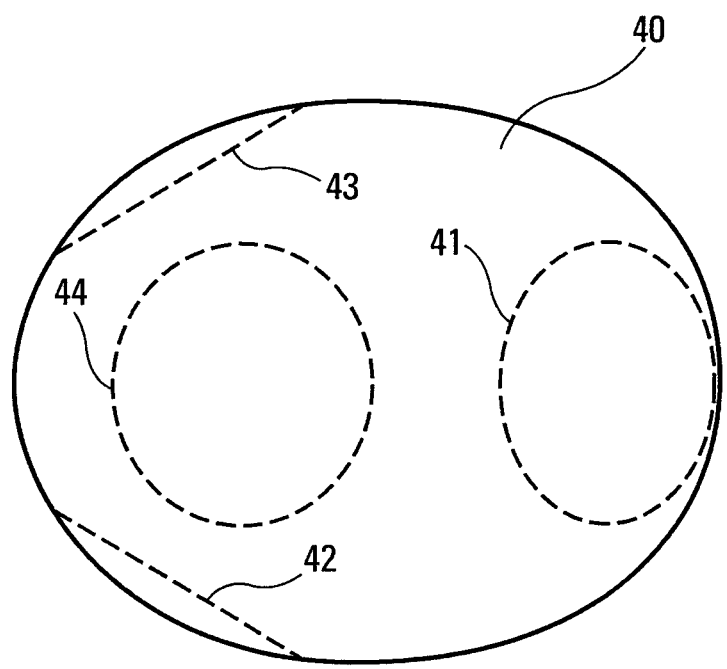

FIGS. 6 and 7 show a headset 40, analog to the headset 27, provided with four loop antennas 41 to 44 provided as a tetrahedron. In such a case, the previous calculations should take into account the angles between said antennas for inferring therefrom the directions of the beacons in the geometrical reference system of the user. Such a four antenna embodiment is advantageous is that, whatever the direction of the beacons, at least three non nul signals are provided for sure, allowing for an excellent resolution of the equations, even in the presence of an electric noise.

It should be noticed that the present invention is not limited to determining the position and the orientation of one single user 1: on the contrary, what has been explained herein above could be applied to a plurality of users 1 being in the location 2.

It has been mentioned herein above that one of the advantages of the present invention is based on the fact that it does not require any prearranged equipment inside the location 2, so that implementing thereof can be particularly discrete. However, optionally, some users could be themselves provided with an emitter also operating at a low frequency so as to transmit their calculated position from external beacons, thus acting as a complementary beacon and allowing, as a result, other users 1 to include such information in the calculation of their own positioning. Moreover, such complementary beacons could be listened to from outside, in order to know the position of complementary beacon carriers.

The invention claimed is:

1. A system for terrestrially positioning a user in a location wherein signals emitted from satellite navigation systems cannot be received, said system comprising:
at least three beacons arranged around said location, outside the latter, and configured to emit radio-electric signals comprising information about the respective terrestrial positions of said beacons, the transmission wavelength of each beacon being at least decametric,
wherein each beacon comprises reception and processing means configured to listen to said radio-electric signals emitted by the other beacons,
wherein each of the at least three beacons is triggered in a cascade beginning with a master beacon,
wherein subsequent beacons are triggered only when the preceding beacon in the cascade has completed an emission and become silent,
at least one equipment associated to said user and comprising at least:
means configured to receive said radio-electric signals emitted from said outside beacons,
calculation means configured to calculate:
from the radio-electric signals received from said beacons, the position and orientation of said equipment with respect to said beacons; and
from such a position and such an orientation, as well as from the information relating to the terrestrial positions of the beacons, comprised in said radio-electric signals, the terrestrial position and orientation of said equipment; and
indication means configured to transmit to said user the thus calculated terrestrial position and orientation of said equipment,
whereby no radio-electric signals are emitted from the inside of the location to the outside thereof.

2. A positioning system according to claim 1, wherein the wavelength of each beacon (3) is at least hectometric.

3. A positioning system according to claim 2, wherein the wavelength of each beacon (3) is at least kilometric.

4. A positioning system according to claim 1, wherein the wavelengths of said beacons (3) are different one from the other, each wavelength being specific to one beacon (3).

5. A positioning system according to claim 1, wherein the wavelengths of said beacons (3) are identical and in that said radio-electric signals (11) emitted from said beacons (3) comprise identification codes being specific to each of them.

6. A positioning system according to claim 1, wherein said beacons (3) comprise input means (6B) for communicating to them information relating to their respective positions.

7. A positioning system according to claim 1, wherein said beacons (3) comprise receiving and processing means (6A) for the signals (7) emitted from a satellite navigation system.

8. A positioning system according to claim 1, wherein said reception means of said equipment (20 to 30) associated to the user (1) comprise at least three antennas (24, 25, 26), of the loop type, the planes of which are not coplanar.

9. A positioning system according to claim 8, wherein the planes of said antennas (24, 25, 26) are two by two orthogonal.

10. A positioning system according to claim 8 for a human user, wherein said antennas are arranged on a headset (27) able to be carried by said user's head.

11. A positioning system according to claim 10, wherein the whole of said equipment is enclosed in a casing (B) to be carried by said user.

12. A positioning system according to claim 1, wherein said indication means (23) represent one selected from the group consisting of the position and orientation of said user on a map, and a plan of said location (2).

13. A positioning system according to claim 1, wherein the system does not comprise an emitter to transmit calculated terrestrial position outside of the location.

* * * * *